(12) United States Patent  (10) Patent No.: US 8,749,145 B2
Jones  (45) Date of Patent: Jun. 10, 2014

(54) DETERMINATION OF LIGHTING CONTRIBUTIONS FOR LIGHT FIXTURES USING OPTICAL BURSTS

(75) Inventor: Morgan Jones, Longmont, CO (US)

(73) Assignee: MoJo Labs, Inc., Longmont, CO (US)

( * ) Notice: Subject to any disclaimer, the term of this patent is extended or adjusted under 35 U.S.C. 154(b) by 116 days.

(21) Appl. No.: 13/310,911

(22) Filed: Dec. 5, 2011

(65) Prior Publication Data

US 2013/0140995 A1  Jun. 6, 2013

(51) Int. Cl.
   *H05B 37/02* (2006.01)
   *H05B 41/36* (2006.01)

(52) U.S. Cl.
   USPC .............................. 315/151; 315/149; 315/150

(58) Field of Classification Search
   USPC .......................................................... 315/151
   See application file for complete search history.

(56) References Cited

U.S. PATENT DOCUMENTS

| | | | |
|---|---|---|---|
| 5,812,422 A * | 9/1998 | Lyons ............................. | 703/18 |
| 6,340,864 B1 | 1/2002 | Wacyk | |
| 6,741,351 B2 | 5/2004 | Marshall et al. | |
| 7,570,246 B2 | 8/2009 | Maniam et al. | |
| 7,583,901 B2 | 9/2009 | Nakagawa et al. | |
| 7,926,300 B2 | 4/2011 | Roberts | |
| 7,952,292 B2 * | 5/2011 | Vegter et al. .................. | 315/153 |
| 8,305,014 B1 * | 11/2012 | Li et al. .......................... | 315/308 |
| 8,330,395 B2 * | 12/2012 | Hoschopf ...................... | 315/312 |
| 8,410,706 B2 | 4/2013 | Steiner et al. | |
| 2006/0087841 A1 | 4/2006 | Chern et al. | |
| 2007/0058987 A1 | 3/2007 | Suzuki | |
| 2008/0203273 A1 | 8/2008 | Deurenberg | |
| 2008/0309255 A1 | 12/2008 | Myers et al. | |
| 2008/0310850 A1 | 12/2008 | Pederson et al. | |
| 2009/0200958 A1 * | 8/2009 | Doherty et al. ............... | 315/291 |
| 2009/0245806 A1 | 10/2009 | Murayama et al. | |
| 2010/0007600 A1 | 1/2010 | Deurenberg et al. | |
| 2010/0045191 A1 | 2/2010 | Aendekerk | |
| 2010/0284690 A1 | 11/2010 | Rajagopal et al. | |
| 2010/0327757 A1 | 12/2010 | Chung et al. | |
| 2010/0327764 A1 | 12/2010 | Knapp | |
| 2011/0011538 A1 | 1/2011 | Hamlyn | |
| 2011/0018465 A1 | 1/2011 | Ashdown | |
| 2011/0031897 A1 * | 2/2011 | Henig et al. ................... | 315/297 |
| 2011/0084615 A1 | 4/2011 | Welten | |
| 2011/0156596 A1 * | 6/2011 | Salsbury ........................ | 315/152 |
| 2011/0199004 A1 | 8/2011 | Henig et al. | |
| 2012/0007511 A1 | 1/2012 | Choong et al. | |
| 2012/0091896 A1 | 4/2012 | Schenk et al. | |
| 2012/0153838 A1 | 6/2012 | Schenk et al. | |

(Continued)

OTHER PUBLICATIONS

U.S. Appl. No. 13/970,424, Dec. 13, 2013, Non-Final OA.

(Continued)

*Primary Examiner* — Alexander H Taningco
*Assistant Examiner* — Nelson Correa
(74) *Attorney, Agent, or Firm* — Maschoff Brennan (57) ABSTRACT

Methods and systems herein provide for determining lighting contributions of light fixtures to an environment. In one embodiment, a system includes a light sensor and a controller. The light sensor generates light level data based on measured light levels. The controller determines a nominal light level based on the light level data, and identifies an optical burst pattern in the light level data generated by a light fixture. The controller then determines a lighting contribution of the light fixture based on the optical burst pattern and the nominal light level.

24 Claims, 7 Drawing Sheets

(56) References Cited

U.S. PATENT DOCUMENTS

| | | |
|---|---|---|
| 2012/0200226 A1 | 8/2012 | Knibbe et al. |
| 2012/0217882 A1 | 8/2012 | Wong et al. |
| 2012/0281879 A1 | 11/2012 | Vlutters et al. |
| 2013/0069540 A1 | 3/2013 | Schenk et al. |
| 2013/0328486 A1 | 12/2013 | Jones |
| 2013/0334971 A1* | 12/2013 | Jones ............................ 315/151 |

OTHER PUBLICATIONS

Non-Final Office Action from U.S. Appl. No. 13/913,157, issued Mar. 3, 2014, 6 pgs.

Notice of Allowance from U.S. Appl. No. 13/970,424, issued Mar. 17, 2014, 13 pgs.

* cited by examiner

DETERMINATION OF LIGHTING CONTRIBUTIONS FOR LIGHT FIXTURES USING OPTICAL BURSTS

FIELD OF THE INVENTION

The invention relates to the field of lighting systems and in particular, to identifying how different light sources contribute to lighting in an environment.

BACKGROUND

Modern indoor lighting systems serve a number of purposes, such as providing a comfortable lighting environment for the occupants of a room, and doing so efficiently. The typical indoor lighting environment may include one or more windows that contribute a varying amount of natural light to the environment of the room over time, and a number of light fixtures that provide sources of artificial light. Thus, a person at a workspace may experience periods of above average lighting in the environment and periods of below average lighting in the environment. In addition, different light fixtures placed across the room may provide different contributions to the lighting at the person's workspace. For example, light fixtures near the workspace may provide a larger contribution of lighting at the workspace than light fixtures farther away. Thus, it can be problematic to determine how different light sources (both artificial and natural) contribute to the lighting in the environment.

SUMMARY

Embodiments described herein advantageously utilize burst patterns encoded in the optical output of light fixtures to determine a lighting contribution of the fixtures in an environment. Using this information, various activities may be performed to more efficiently utilize the lighting available. For example, knowing the lighting contribution of various lighting fixtures may allow for a reduction of energy usage in providing an adequate amount of lighting in the environment.

One embodiment is a system comprising a light sensor and a controller. The light sensor generates light level data based on measured light levels. The controller determines a nominal light level based on the light level data, identifies an optical burst pattern in the light level data generated by a light fixture, and determines a lighting contribution of the light fixture based on the optical burst pattern and the nominal light level.

In another embodiment, the controller determines the lighting contribution of the light fixture by calculating a difference between an amplitude of the optical burst pattern and the nominal light level. In this embodiment, the controller may perform an averaging process or some other type of low frequency filtering of the light level data to calculate the nominal light level.

In another embodiment, the controller determines a difference between the nominal light level and a target light level. The controller calculates a change in the optical output of the light fixture based on the lighting contribution of the light fixture and the difference. The controller then generates an instruction to adjust the optical output of the light fixture to reach the target level.

Another embodiment is a system comprising a light source and a controller. The light source generates an optical output. The controller modulates the optical output of the light source to generate an optical bust pattern that is substantially imperceptible. The controller receives information for a lighting contribution of the light source at a light sensor based on the optical burst pattern and a nominal light level at the light sensor, and adjusts the optical output of the light source based on the lighting contribution.

In another embodiment, the controller receives information about the nominal light level and information about a target light level, and determines a difference between the nominal light level and the target light level. The controller then calculates a change in the optical output of the light source based on the lighting contribution, and adjusts the optical output of the light source to reach the target level.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
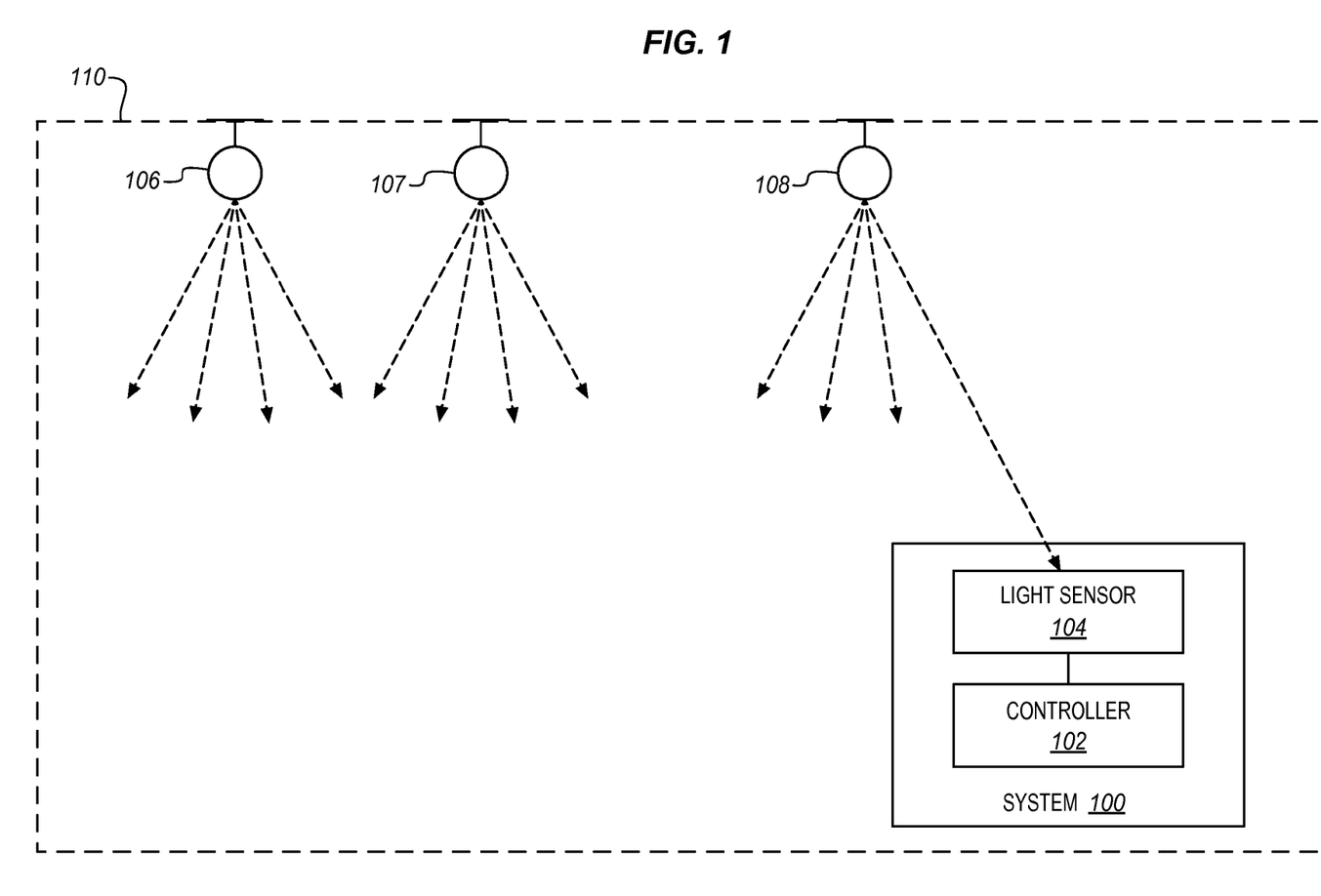
FIG. 1 is a block diagram of a lighting system and one or more light fixtures in an exemplary embodiment.

FIG. 1 is a block diagram of a lighting system 100 and one or more light fixtures 106-108 in an exemplary embodiment. Light fixtures 106-108 generate visible light (illustrated as dashed lines in FIG. 1) for an environment 110, and may generate light by various technological means, such as Light Emitting Diodes (LEDs), incandescent bulbs, fluorescent based systems, etc. In this embodiment, one or more light fixtures 106-108 generate optical burst patterns in their optical output. The optical burst patterns are imperceptible to the human eye, but are detectable by system 100. System 100 then determines a lighting contribution to environment 110 from one or more light fixtures 106-108 based on the detected optical bursts. Based on the lighting contributions from light fixtures 106-108, system 100 may perform various activities to control lighting within environment 110, such as modifying the optical output of one or more of light fixtures 106-108.

In this embodiment, system 100 includes a controller 102 and a light sensor 104. Generally, controller 102 includes any component, system, or device that is operable to determine the lighting contributions from one or more light fixtures 106-108 in environment 110. Light sensor 104 includes any component, system, or device that is operable to measure visible light levels. The light levels measured by light sensor 104 may be generated by artificial (e.g., light fixtures 106-108) or natural (i.e., sunlight) light sources. Light sensor 104 may include photo-resistive based sensors, Charged Coupled Devices (CCDs), photodiodes, photovoltaic cells, or other types of optical detectors as a matter of design choice. When measuring light levels, light sensor 104 may generate an analog output (e.g., voltage or current) representative of the measurement, a digital output representative of the measurement, etc. How system 100 may operate will be discussed in more detail with regard to FIG. 2.

Figure 2:
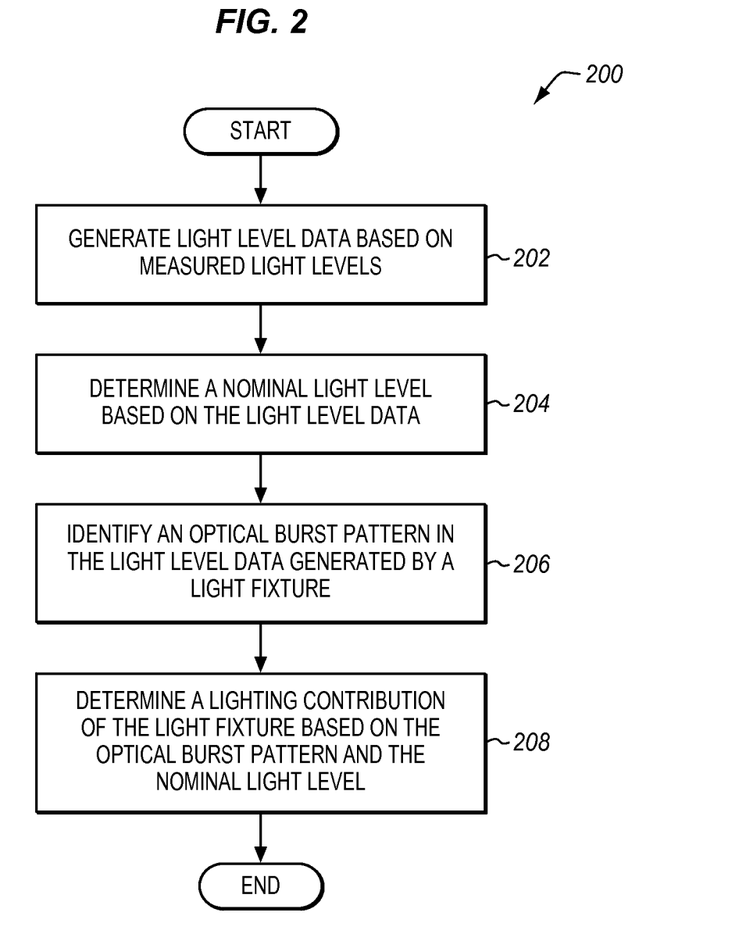
FIG. 2 is a flowchart illustrating a method of determining lighting contributions of one or more light fixtures in an exemplary embodiment.

FIG. 2 is a flowchart illustrating a method 200 for determining lighting contributions from one or more light fixtures 106-108 in an exemplary embodiment. The steps of method 200 will be described with respect to system 100 of FIG. 1, although one skilled in the art will understand that method 200 may be performed by other systems not shown. The steps of the flowcharts described herein are not all inclusive and may include other steps not shown. The steps may also be performed in an alternate order.

In step 202, light sensor 104 generates light level data based on measured light levels. Light sensor 104 may be placed at any position within environment 110 as a matter of design choice. For example, light sensor 104 may be placed at a person's workspace to measure light levels at the workspace, may move along with a person within environment 110, etc.

In step 204, controller 102 determines a nominal light level based on the light level data. Determining the nominal light level may be performed by controller 102 in a number of different ways, such as through the application of digital filters (e.g., moving average filters, Finite Impulse Response (FIR) filters, Infinite Impulse Response (IIR) filters, notch filters, etc.), analog circuits applied to the light level data, etc. For example, controller 102 may read a datastream of digital light level values from light sensor 104 over time, and apply a notch filter to the datastream when determining the nominal light level in order to remove narrow band noise from the light level data.

Figure 3:
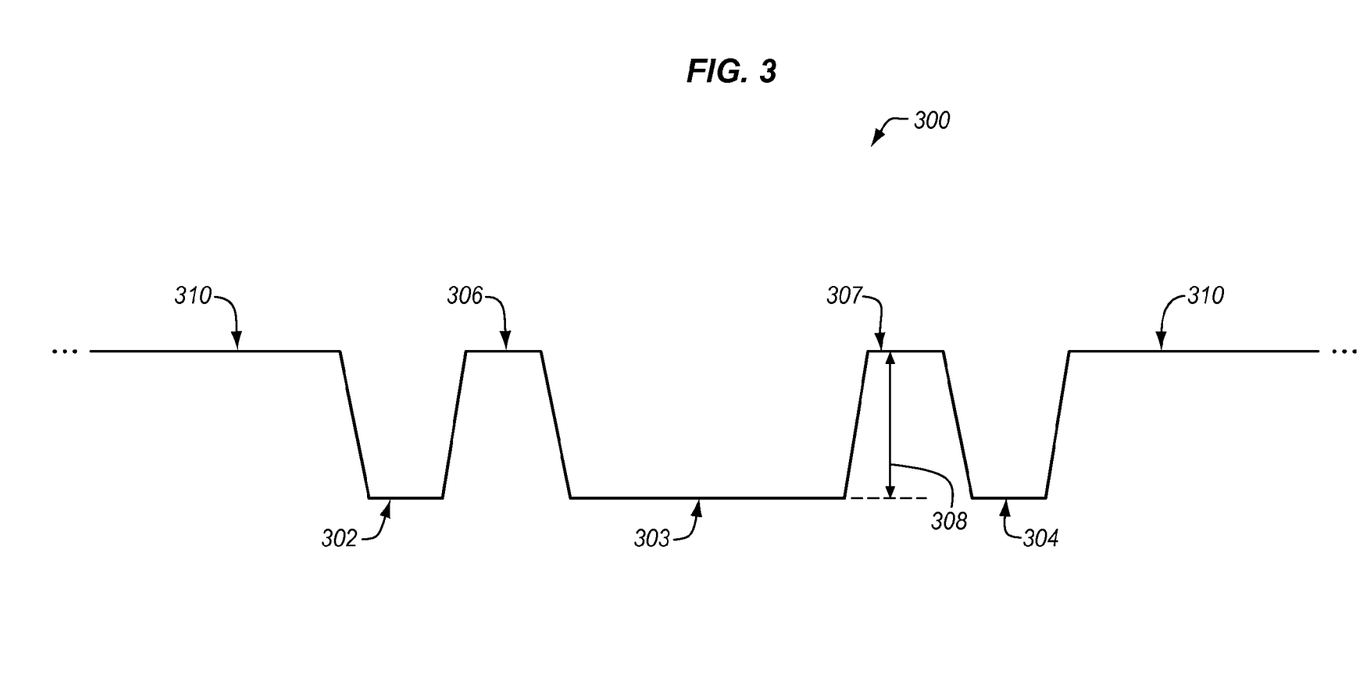
FIG. 3 is an example of an optical burst pattern generated by one or more light fixtures in an exemplary embodiment.

In step, 206, controller 102 identifies an optical burst pattern in the light level data generated by one or more light fixtures 106-108. The optical burst pattern in the optical output of one or more light fixtures 106-108 may be a series of full off or partial off, a series of full on or partial on states, or some combination of the states. Generally, the optical burst pattern is imperceptible to an observer within environment 110. The optical burst pattern may be imperceptible because the rate of the burst pattern is too fast for the observer to notice and/or because the amplitude modulation of the optical output is too small for the observer to notice. FIG. 3 is an example of an optical burst pattern 300 generated by one or more light fixtures 106-108 in an exemplary embodiment. In this embodiment, optical burst pattern 300 includes one or more amplitude modulations for an optical output of light fixtures 106-108. Optical burst pattern 300 in FIG. 3 illustrates examples of optical off pulses 302-304 and optical on pulses 306-307 generated by light fixtures 106-108. Optical burst pattern 308 also illustrates a level 310 representative of the nominal light level. Off pulses 302-304 are generated when an optical output of one of light fixtures 106-108 decreases from a previous level (e.g., a fixture is temporarily turned off or partially off). On pulses 306-307 may be generated as the fixture output returns to its previous output level (e.g., some partial output level or a full power output level). In some embodiments, optical burst pattern 300 may encode information that uniquely identifies a particular one of light fixtures 106-108. Encoding information in the optical burst patterns may be performed by generating a sequence of on-off pulses in the optical burst that digitally encode the identifiers.

In step 208, controller 102 determines a lighting contribution of one or more light fixtures 106-108 based on the optical burst pattern and the nominal light level. For example, a lighting contribution may be related to a change in amplitude 308 of the measured light levels during off pulses 302-304 as compared to the nominal light level (e.g., level 310 of FIG. 3) determined in step 204.

By advantageously determining how different light fixtures 106-108 contribute to lighting in environment 110, various activities may be performed more efficiently. For instance, system 100 may determine that light fixture 106 contributes very little to the present lighting at light sensor 104, perhaps due to light fixture 106 being far away from light sensor 104. Thus, it would be less efficient to operate light fixture 106 at a high power level when attempting to increase the lighting level at light sensor 104. In contrast, another lighting fixture may be able to contribute more lighting at light sensor 104 utilizing a similar and/or lower power level.

In some embodiments, controller 102 may determine the power utilized by one or more light fixtures 106-108 when generating a corresponding optical output. Controller 102 may transmit commands to light fixtures 106-108 requesting the information, and in response, receive the power utilization information. The power utilization information sent by light fixtures 106-108 may be transmitted optically (e.g., by modulating a corresponding optical output of a fixture to encode the information), wirelessly, etc. In this embodiment, controller 102 may calculate the efficiency of light fixtures 106-108 based on their lighting contributions and their power utilization. When the efficiency of light fixtures 106-108 is known, controller 102 may then calculate a change in the optical output for one of fixtures 106-108 to reach a target light level at light sensor 104. This allows system 100 to control the lighting in environment 110 more accurately.

Figure 4:
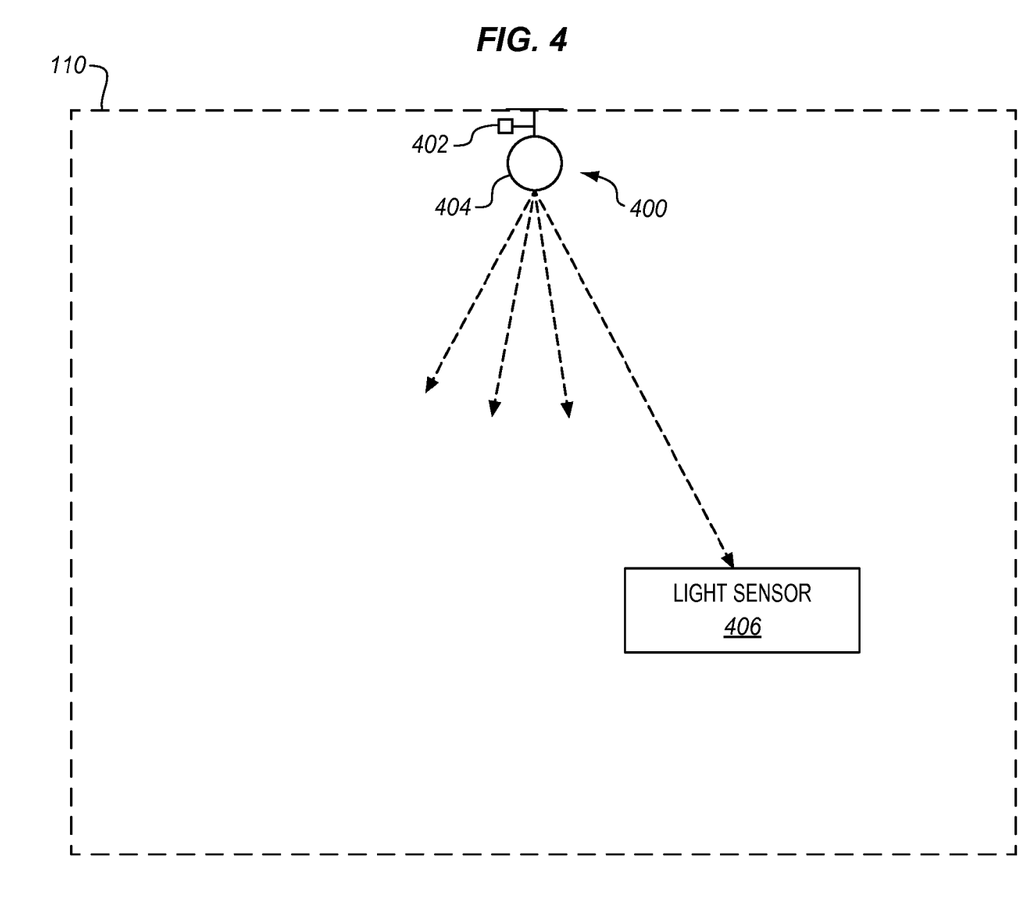
FIG. 4 is a block diagram of a light fixture in an exemplary embodiment.

FIG. 4 is a block diagram of a light fixture 400 in an exemplary embodiment. In this embodiment, light fixture 400 includes a controller 402 and a light source 404. In light fixture 400, controller 402 includes any component, system, or device that is operable to modulate an optical output of light source 404 to generate optical burst patterns. Controller 402 may then receive information about the lighting contribution of light source 404, and adjust the optical output of light source 404 to control the lighting in environment 110. In some embodiments, light fixture 400 may receive information about the lighting contribution of light source 404 at a remote light sensor, such as light sensor 406. Such information may be received by light fixture 400 over a wireless interface (e.g., radio, optical, etc.) and/or a wired interface. Light source 404 includes any component, system, or device that is operable to provide lighting to environment 110. Light source 404 may include artificial and natural sources of light. One example of light source 404 as a natural source of light is a window. In this example, the window may include a variable opacity thin film that modulates an intensity of natural lighting provided to environment 110. How system 400 may operate will be discussed in more detail with regard to FIG. 5.

Figure 5:
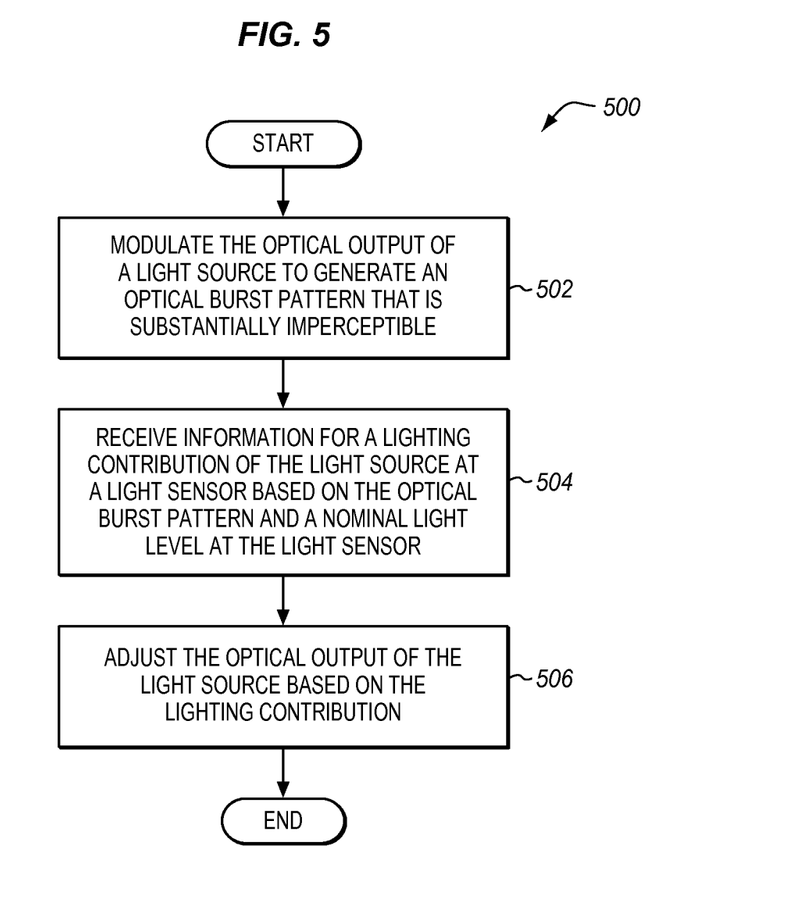
FIG. 5 is a flow chart illustrating a method of coordinating lighting for an environment in an exemplary embodiment.

FIG. 5 is a flow chart illustrating a method 500 for coordinating lighting for environment 110 in an exemplary embodiment. The steps of method 500 will be described with respect to light fixture 400 of FIG. 4, although one skilled in the art will understand that method 500 may be performed by other systems not shown.

In step 502, controller 402 modulates an optical output of light source 404 to generate an optical burst pattern that is substantially imperceptible to an observer. Controller 402 may perform an amplitude modulation of the optical output of light source 404 to generate a burst pattern at a high frequency. For instance, controller 402 may modulate the optical output of light source 404 to generate optical pulses of less than about 400 microseconds, which may be substantially imperceptible to most observers. Controller 402 may modulate the optical output of light source 404 in a variety of ways, such as varying a current to light source 404, varying opacity of a thin film applied to a surface of light source 404, etc.

In step 504, controller 402 receives information for a lighting contribution of light source 404 at a light sensor 406 based on the optical burst pattern and a nominal light level at light sensor 406. For example, a control system (not shown in FIG. 4) coupled with light sensor 406 may analyze the burst pattern generated in step 502 and compare the burst pattern to a nominal lighting level measured by light sensor 406. The control system may then transmit information about the lighting contribution of light source 404 to controller 402.

In step 506, controller 402 adjusts the optical output of light source 404 based on the lighting contribution information received in step 504.

In some embodiments, controller 402 may receive information about the nominal lighting level measured at light sensor 406, and a target lighting level for environment 110. Controller 402 may then determine a difference between the nominal light level and the target light level, and calculate a change in the optical output of light source 404 based on the lighting contribution of light source 404 at light sensor 406. Controller 402 may then adjust light source 404 to reach the target level.

In other embodiments, controller 402 may receive a list of light fixtures and their associated efficiencies. Controller 402 may then apply various control algorithms to vary the optical output of light source 404 based on an efficiency of light source 404 and/or the efficiencies of other light sources.

EXAMPLES

Figure 6:
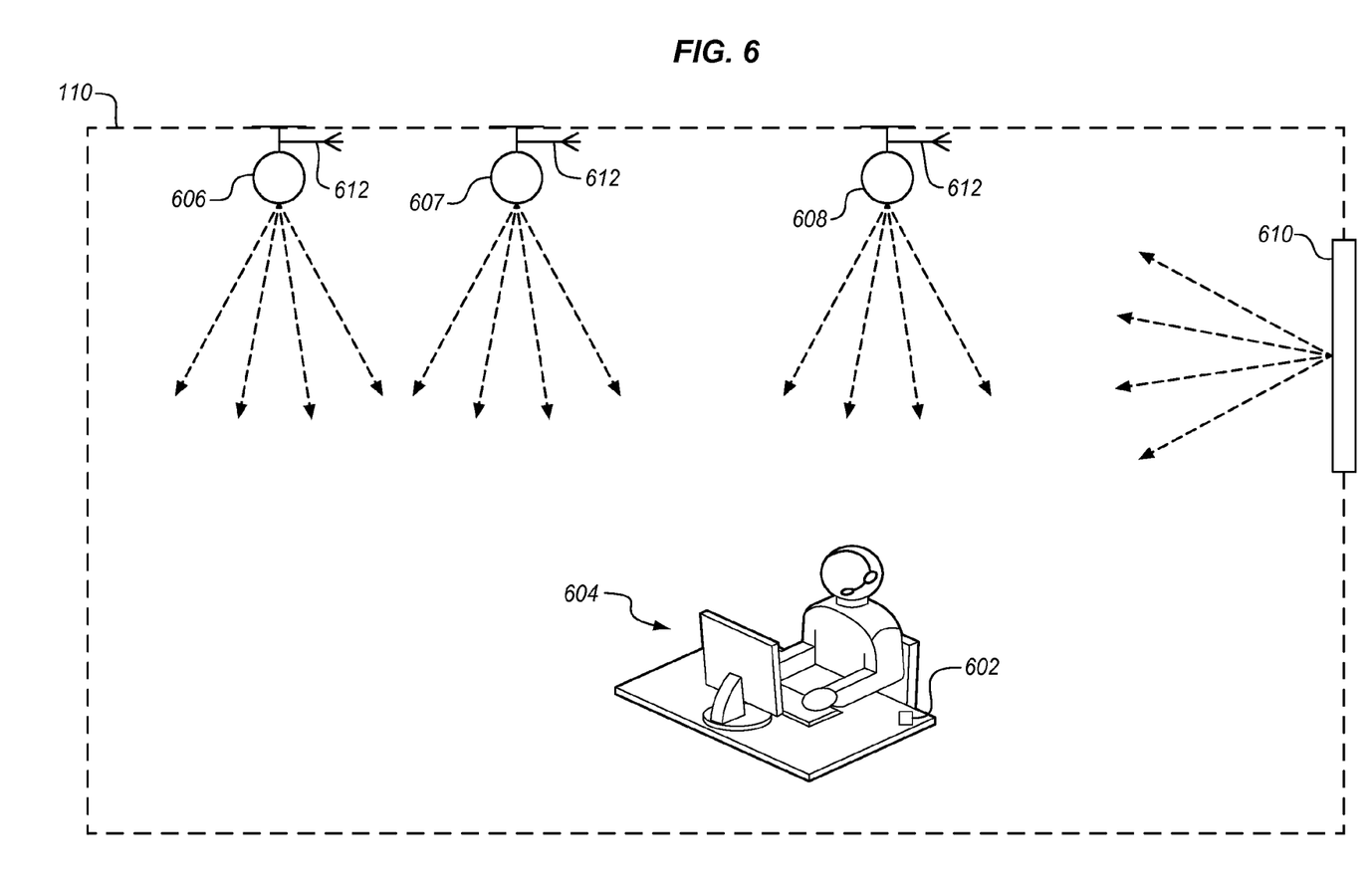
FIG. 6 is a block diagram of a lighting controller in an exemplary embodiment.

A first example is shown in FIG. 6, which is a block diagram of a lighting controller 602 in an exemplary embodiment. In addition to lighting controller 602, FIG. 6 illustrates light fixtures 606-608 as sources of artificial light for environment 110, and a window 610 as a source of natural light for environment 110. In FIG. 6, lighting controller 602 is located proximate to a person's workspace 604.

Over time, the amount of natural light provided by window 610 to workspace 604 changes. When light fixtures 606-608 provide a fixed amount of artificial light during the same time period, this results in a variable amount of lighting at workspace 604. This can be an inefficient use of the lighting available in environment 110. Controller 602 solves this problem by dynamically adjusting the amount of artificial light at workspace 604. In this embodiment, light fixtures 606-608 generate optical burst patterns in their optical output that are detected by controller 602. Controller 602 also detects an amount of lighting present at workspace 604. By determining an amount of artificial light provided by light fixtures 606-608 at workspace 604, controller 602 can dynamically determine the artificial lighting contributions and the natural lighting contributions at workspace 604. Controller 602 may determine the contributions of light fixtures 606-608 by comparing an average light level measured at controller 602 with the burst patterns generated by light fixtures 606-608. Controller 602 may then transmit commands to one or more light fixtures 606-608, or directly control the optical output of one or more light fixtures 606-608 to compensate for changes in the lighting provided by window 610. For instance, if window 610 temporarily provides more lighting to workspace 604, then controller 602 in concert with light fixtures 606-608 may reduce the optical output of one or more light fixtures 606-608. This advantageously utilizes the natural lighting available in environment 110 more efficiently and also reduces the power utilized by light fixtures 606-608. In the converse, if window 610 temporarily provides less lighting to workspace 604, then controller 602 in concert with light fixtures 606-608 may increase the optical output of one or more light fixtures 606-608. This advantageously provides a substantially constant lighting at workspace 604 while still utilizing what natural light is available.

While in this example window 610 is discussed with regard to supplying a varying amount of natural light to environment 110 due to the typical outdoor lighting changes during the day, window 610 may be modified in some embodiments to include a variable opacity thin film. Similar to the thin films used to modulate opacity in liquid crystal display panels, a thin film applied to window 610 may be utilized to modulate the natural lighting available to environment 110. In a manner similar to generating burst patterns in artificial lighting, modifying window 610 with a thin film may also allow for generating burst patterns in the natural lighting provided by window 610 to environment 110, and for controlling the contribution of natural lighting provided by window 610. This may allow controller 602 to more accurately utilize the artificial and natural lighting available to environment 110.

Figure 7:
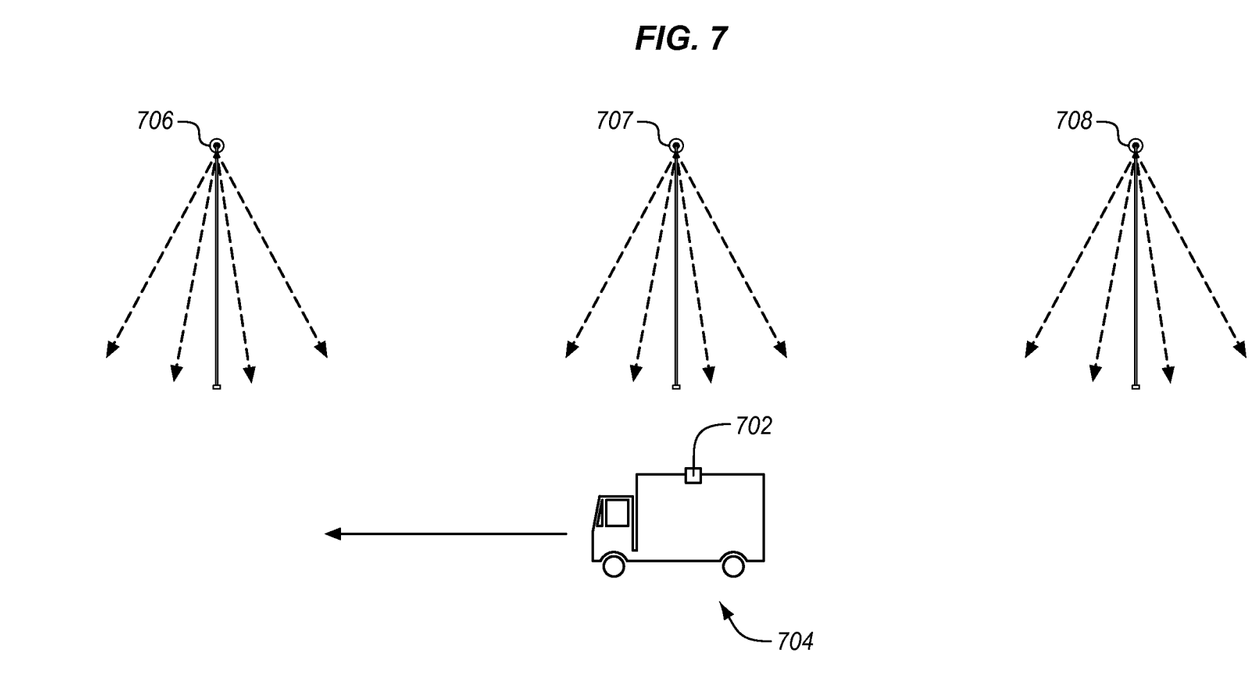
FIG. 7 is a block diagram of a lighting monitor in an exemplary embodiment.

A second example is shown in FIG. 7, which is a block diagram of a lighting monitor 702 in an exemplary embodiment. In the second example, lighting monitor 702 is mounted to a truck 704. Truck 704 is travelling in the direction indicated by the arrow in FIG. 7. More particularly, truck 704 travels past a number of street lights 706-708 to allow lighting monitor 702 to determine the lighting contributions of street lights 706-708.

One problem encountered by municipalities is the maintenance of street lighting. Typically, the optical output of a street light decreases over time as the bulbs age. As some low lighting threshold is reached for a particular street light, the bulb is replaced. In current practice, a municipal worker travels to each street light and uses a light meter to determine a light output for the light. This is time consuming and prone to errors. First, the worker may accidentally measure the optical output of the wrong light. This may result in unusual changes in the optical output data for a particular light over time. Second, the worker may accidentally measure the optical output of a particular street light at different distances over time. This may result in the measurement changing over time due to changes in the distance, which may be interpreted that it is time for a bulb replacement. Controller 702 in concert with street lights 706-708 solves these problems by measuring optical burst patterns generated by street lights 706-708 to determine the contributions of street lights 706-708 as truck 704 travels. More specifically, when street lights 706-708 generate optical burst patterns that include unique identifiers, then controller 702 may automatically log lighting contributions for each of street lights 706-708 using the identifiers by merely driving truck 704 around the municipality. This reduces the opportunity for measuring the wrong light when measuring lighting contributions for street lights 706-708. Further, if truck 704 is equipped with location based services, such as a Global Positioning System (GPS) receiver, then controller 702 in concert with the GPS receiver may not only capture and log lighting contributions for street lights 706-708, but also log location based information during the analysis of the lighting contributions for street lights 706-708. The location based information may then be used to normalize the lighting contributions for street lights 706-708 based on a distance between truck 704 and each of street lights 706-708. This reduces the opportunity for distance based measurement errors that mimic changes in the optical output of street lights 706-708 over time.

Any of the various elements shown in the figures or described herein may be implemented as hardware, software, firmware, or some combination of these. For example, an element may be implemented as dedicated hardware. Dedicated hardware elements may be referred to as "processors," "controllers," or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

I claim:

1. A light sensor system comprising:
a light sensor operable to generate light level data based on measured light levels; and
a controller, coupled with the light sensor, operable:
to determine a nominal light level based on the light level data,
to identify an optical burst pattern in the light level data generated by a light fixture, wherein the light fixture is remotely disposed relative to the light sensor, and wherein the burst pattern includes a plurality of pulses having an intensity less than the nominal light level,
to determine a lighting contribution of the light fixture based on both the optical burst pattern and the nominal light level, wherein the lighting contribution is related to the change in amplitude of the burst pattern as compared to the nominal light level;
to generate an instruction to adjust the optical output of the light fixture based on the lighting contribution of the light fixture; and
to wirelessly send the instruction to the light fixture.

2. The light sensor system of claim 1 wherein:
the controller is further operable to determine the lighting contribution of the light fixture by calculating a difference between an amplitude of the optical burst pattern and the nominal light level.

3. The light sensor system of claim 1 wherein:
the controller is further operable to determine a difference between the nominal light level and a target light level, to calculate a change in the optical output of the light fixture based on the lighting contribution of the light fixture and the difference.

4. The light sensor system of claim 1 wherein:
the controller is further operable to identify optical burst patterns from a plurality of light fixtures remotely disposed relative to the light sensor, and to determine a lighting contribution for each of the light fixtures.

5. The light sensor system of claim 4 wherein:
each of the optical burst patterns encodes an identifier for a corresponding light fixture;
the controller is further operable to identify each of the light fixtures by decoding the optical burst patterns; and
the controller is further operable to identify a light fixture having a highest lighting contribution.

6. The light sensor system of claim 5 wherein:
the controller is further operable to generate an instruction to adjust the optical output of the light fixture having the highest lighting contribution.

7. The light sensor system of claim 1 wherein:
the controller is further operable to determine a power utilized by the light fixture in generating the optical output for the light fixture, and to calculate an efficiency of the light fixture based on the power utilized and the lighting contribution of the light fixture.

8. The light sensor system of claim 7 wherein:
the controller is further operable to determine a difference between the nominal light level and a target light level, to calculate a change in the optical output of the light fixture based on the efficiency of the light fixture and the difference.

9. The light sensor system of claim 1 wherein:
the optical burst pattern is a series of full-off pulses in the optical output of the light fixture; and
the controller is further operable to determine the lighting contribution of the light fixture by comparing a minimum light level measured during the optical burst pattern to the nominal light level.

10. A method occurring at a light sensor comprising:
generating light level data based on measured light levels;
determining a nominal light level based on the light level data;
identifying an optical burst pattern in the light level data generated by a light fixture, wherein the light fixture is remotely disposed relative to the light sensor, and wherein the burst pattern includes a plurality of pulses having an intensity less than the nominal light level;
determining a lighting contribution of the light fixture based on both the optical burst pattern and the nominal light level, wherein the lighting contribution is related to the change in amplitude of the burst pattern as compared to the nominal light level;
generating an instruction to adjust the optical output of the light fixture based on the lighting contribution of the light fixture; and
sending the instruction to the light fixture.

11. The method of claim 10 wherein:
determining the lighting contribution of the light fixture further comprises:

calculating a difference between an amplitude of the optical burst pattern and the nominal light level.

12. The method of claim 10 further comprising:
determining a difference between the nominal light level and a target light level; and
calculating a change in the optical output of the light fixture based on the lighting contribution of the light fixture and the difference; and
wherein generating an instruction to adjust the optical output of the light fixture comprises generating an instruction to adjust the optical output of the light fixture to reach the target level.

13. The method of claim 10 wherein:
identifying the optical burst pattern further comprises:
identifying optical burst patterns from a plurality of light fixtures, wherein each of the plurality of the light fixtures are remotely disposed relative to the light sensor; and
determining the lighting contribution further comprises:
determining a lighting contribution for each of the light fixtures.

14. The method of claim 13 wherein:
each of the optical burst patterns encodes an identifier for a corresponding light fixture; and
the method further comprises:
identifying each of the light fixtures by decoding the optical burst patterns; and
identifying a light fixture having a highest lighting contribution.

15. The method of claim 14 further comprising: wherein generating an instruction to adjust the optical output of the light fixture comprises generating an instruction to adjust the optical output of the light fixture having the highest lighting contribution.

16. The method of claim 10 further comprising:
determining a power utilized by the light fixture in generating the optical output for the light fixture; and
calculating an efficiency of the light fixture based on the power utilized and the lighting contribution of the light fixture.

17. The method of claim 16 further comprising:
determining a difference between the nominal light level and a target light level;
calculating a change in the optical output of the light fixture based on the efficiency of the light fixture and the difference; and
wherein generating an instruction to adjust the optical output of the light fixture comprises generating an instruction to adjust the optical output of the light fixture to reach the target level.

18. The method of claim 10 wherein:
the optical burst pattern is a series of full-off pulses in the optical output of the light fixture; and
determining a lighting contribution of the light fixture further comprises:
comparing a minimum amplitude of the burst pattern to the nominal light level.

19. A light fixture comprising:
a light source operable to provide an optical output; and
a controller operable:
to modulate the optical output of the light source to generate an optical burst pattern that is substantially imperceptible, and wherein the optical burst pattern includes a plurality of pulses having an intensity less than a nominal light level,
to receive from a light sensor information for a lighting contribution of the light source at the light sensor, wherein the lighting contribution is based on both the optical burst pattern and the nominal light level at the light sensor, wherein the lighting contribution is related to the change in amplitude of the burst pattern as compared to the nominal light level, and
to adjust the optical output of the light source based on the lighting contribution.

20. The light fixture of claim 19 wherein:
the controller is further operable to receive information about the nominal light level and information about a target light level, to determine a difference between the nominal light level and the target light level, to calculate a change in the optical output of the light source based on the lighting contribution, and to adjust the optical output of the light source to reach the target light level.

21. The light fixture of claim 19 wherein:
the light source includes a variable opacity thin film to vary an optical output of the light source; and
the controller is further operable to modulate the opacity of the thin film to vary the optical output of the light source.

22. A method comprising:
modulating an optical output of a light source to generate an optical burst pattern that is substantially imperceptible, and wherein the optical burst pattern includes a plurality of pulses having an intensity less than a nominal light level;
receiving from a light sensor information for a lighting contribution of the light source at the light sensor based on both the optical burst pattern and the nominal light level at the light sensor, wherein the lighting contribution is related to the change in amplitude of the burst pattern as compared to the nominal light level; and
adjusting the optical output of the light source based on the lighting contribution.

23. The method of claim 22 further comprising:
receiving information about the nominal light level and information about a target light level;
determining a difference between the nominal light level and the target light level; calculating a change in the optical output of the light source based on the lighting contribution; and
adjusting the optical output of the light source to reach the target level.

24. The method of claim 22 wherein:
modulating the optical output further comprises:
modulating an opacity of a thin film applied to the light source to vary an optical output of the light source.

* * * * *